United States Patent
Baker et al.

(10) Patent No.: US 9,830,662 B1
(45) Date of Patent: Nov. 28, 2017

(54) SPLIT SENSING METHOD

(71) Applicant: STATE FARM MUTUAL AUTOMOBILE INSURANCE COMPANY, Bloomington, IL (US)

(72) Inventors: Nicholas R. Baker, Normal, IL (US); David W. Thurber, Sherman, IL (US); Paul Christopher Rutkowski, Normal, IL (US); Benjamin F. Bowne, Mackinaw, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 113 days.

(21) Appl. No.: 14/215,789

(22) Filed: Mar. 17, 2014

Related U.S. Application Data

(60) Provisional application No. 61/793,640, filed on Mar. 15, 2013.

(51) Int. Cl.
- *G06Q 40/08* (2012.01)
- *G07C 5/00* (2006.01)
- *G06Q 40/00* (2012.01)

(52) U.S. Cl.
CPC ............. *G06Q 40/08* (2013.01); *G07C 5/008* (2013.01)

(58) Field of Classification Search
CPC ........ G06Q 40/00; G06Q 40/08; G07C 5/008; G06F 17/60
See application file for complete search history.

(56) References Cited

U.S. PATENT DOCUMENTS

| | | | | |
|---|---|---|---|---|
| 5,797,134 A | * | 8/1998 | McMillan | G06Q 30/0283 705/4 |
| 9,141,996 B2 | * | 9/2015 | Christensen | G07C 5/00 |
| 2009/0024419 A1 | * | 1/2009 | McClellan | G06Q 40/02 705/4 |

(Continued)

OTHER PUBLICATIONS

Reese et al. North Central Texas Pay-As-You-Drive Insurance Pilot Program:Transportation, Land Use, Planning, and Air Quality : Selected Papers of the Transportation, Land Use, Planning, and Air Quality Conference 2009 . 2009.*

(Continued)

*Primary Examiner* — Muriel Tinkler

(74) *Attorney, Agent, or Firm* — Marshall, Gerstein & Borun LLP

(57) ABSTRACT

Client side and server side methods for combining data originating from an On Board Diagnostics (OBD) cap with data originating from a client computing device are presented. The method includes receiving, from a client computing device via a computer network, a plurality of OBD cap data originating from an OBD cap and receiving, from the client computing device via the computer network, a plurality of client computing device data originating from the client computing device. The method also includes selecting, at a processor, a first data parameter from the plurality of OBD cap data and selecting, at the processor, a second data parameter from the plurality of client computing device data. The method further includes analyzing, at the processor, the first data parameter and the second data parameter and flagging, at the processor, an insurance account associated with the OBD device as a result of the analysis.

18 Claims, 6 Drawing Sheets

(56) References Cited

U.S. PATENT DOCUMENTS

| | | | | |
|---|---|---|---|---|
| 2010/0131304 A1* | 5/2010 | Collopy | ............. | G06Q 30/0224 |
| | | | | 705/4 |
| 2012/0010906 A1* | 1/2012 | Foladare | ................ | G06Q 40/08 |
| | | | | 705/4 |
| 2014/0257870 A1* | 9/2014 | Cielocha | .................. | G07C 5/00 |
| | | | | 705/4 |

OTHER PUBLICATIONS

Desyllas et al. Profiting from business model innovation: Evidence from Pay-As-You-Drive auto insurance. SciVerse Science Direct. Research Policy 42 (2013) 101-116.*

* cited by examiner

SPLIT SENSING METHOD

CROSS-REFERENCES TO RELATED APPLICATIONS

The present application claims the benefit of U.S. Provisional Application No. 61/793,640, entitled "Split Sensing Method," filed on Mar. 15, 2013, which is hereby incorporated by reference herein in its entireties.

TECHNICAL FIELD

The present disclosure generally relates to a system and method for combining data originating from an On Board Diagnostics (OBD) cap with data originating from a client computing device for use flagging user accounts and adjusting insurance premiums.

BACKGROUND

Insurance companies desire to collect vehicle and driver behavior data for use in enhancing policyholder risk assessment. Current products that collect this data require the purchase of an expensive device (typically greater than $100 each) that connect to the insured's automobile for data collection. These devices also require monthly recurring cellular data transport costs. At scale, these expenses become cost prohibitive for an insurance company.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In the present "Split Sensing" system, an On-Board Diagnostics (OBD) cap records data and transmits the recorded data to a client computing device, such as a smart phone. The client computing device may record additional data and combine the data collected with the client computing device with the received OBD data and transmits the combined data to a backend data server. In this way, an OBD cap uses a client computing device, such as a smart phone, as a proxy to transmit data to the backend data server. This approach significantly reduces the hardware expense requirements for the OBD cap that connects to the vehicle and eliminates the need for cellular data transport associated with the OBD cap, which in turn eliminates the monthly recurring charges associated with those services. This approach also increases the accuracy of the data collected by the OBD, by providing a second set of data (collected by the client computing device) to augment the OBD data. Furthermore, the split sensing approach provides the possibility for numerous authentication techniques to establish whether or not a customer is attempting to spoof the OBD cap in order to receive artificially lower insurance rates. The split sensing approach is able to track the habits of the driver (i.e. the insured customer) as opposed to prior systems which merely tracked the vehicle. This allows insurance companies to more precisely determine if the insured is driving a vehicle and determine more accurate insurance rates.

In accordance with an example of the present disclosure, a computer implemented method for combining data is presented. The method includes receiving, from a client computing device via a computer network, a plurality of OBD cap data originating from an OBD cap and receiving, from the client computing device via the computer network, a plurality of client computing device data originating from the client computing device. The method also includes selecting, at a processor, a first data parameter from the plurality of OBD cap data and selecting, at the processor, a second data parameter from the plurality of client computing device data. The method further includes analyzing, at the processor, the first data parameter and the second data parameter and flagging, at the processor, an insurance account associated with the OBD device as a result of the analysis.

In accordance with an example of the present disclosure, another computer implemented method for combining data is presented. The method includes receiving, via a wireless personal area network, first data from an OBD cap and recording, via an internal sensor, second data. The method also includes combining, at a processor, the first data and the second data into third data and transmitting, via a computer network, the third data to a data server.

In accordance with another example of the present disclosure, yet another computer implemented method for combining data is presented. The method includes receiving, from a client computing device via a computer network, a plurality of encrypted OBD cap data including OBD acceleration data and OBD GPS data originating from an OBD cap and receiving, from the client computing device via the computer network, a plurality of client computing device data originating from the client computing device included client computing device acceleration data and client computing device GPS data. The method also includes decrypting, at the processor, the encrypted OBD cap data, extracting, at the processor, the OBD acceleration data and OBD GPS data parameter from the plurality of OBD cap data and extracting, at the processor, client computing device acceleration data and client computing device GPS data from the plurality of client computing device data. The method further includes determining, at the processor, whether the OBD acceleration data corresponds to the client computing device acceleration data, wherein, if it is determined that the OBD acceleration data does not correspond to the client computing device acceleration data, the method includes adjusting, at the processor, an insurance premium of the vehicle insurance account associated with the client computing device. The method also includes determining, at the processor whether the OBD GPS data corresponds to the client computing device GPS data, wherein, if it is determined that the OBD GPS data does not correspond to the client computing device GPS data, the method includes adjusting, at the processor, an insurance premium of the vehicle insurance account associated with the client computing device.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
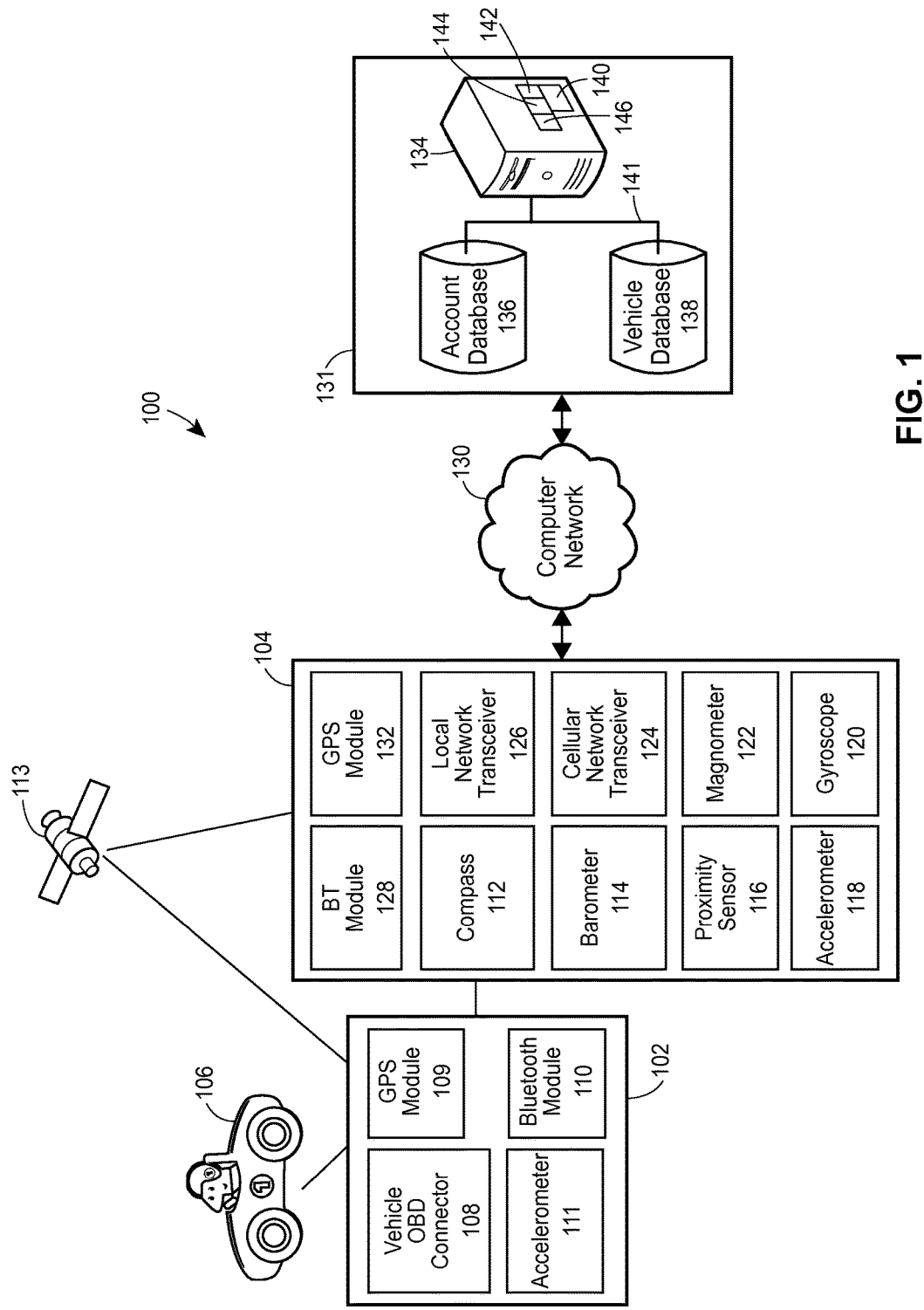
FIG. 1 is a simplified and exemplary block diagram of a system for split-sensing.

FIG. 1 illustrates various aspects of an exemplary architecture implementing a split sensing system 100. The high-level architecture includes both hardware and software applications, as well as various data communications channels for communicating data between the various hardware and software components. The split sensing system 100 may include various software and hardware components or modules.

The split sensing system 100 may include front end components, including an On-board diagnostics (OBD) cap 102 and a client computing device 104. The OBD cap 102 may be connected to a vehicle 106 via a Vehicle OBD connector 108, such as the OBD-II diagnostic connector interface. The OBD cap 102 may include a processor to execute instructions to retrieve data relating to the vehicle 106 from the vehicle's 106 OBD system. The processor of the OBD cap 102 may also execute instructions to collect data from one or more sensors integrated within the OBD cap 102. In some embodiments, the OBD cap 102 may collect Global Position System (GPS) coordinates from a GPS module 110, in communication with one or more GPS satellites 113. The OBD cap 102 may also include one or more accelerometers 111. The OBD cap 102 may also include a BLUETOOTH® module 109 for communication with client computing device 104. The processor of the OBD cap may also execute instructions to use the BLUETOOTH® module 110 to communicate with one more client computing devices 104 via one or more wireless personal area network (PAN) interfaces, such as BLUETOOTH®.

The client computing device 104 may include a personal computer, a smart phone, a tablet computer, a smart watch, a head mounted display, a wearable computer or other suitable client computing device. A processor of the client computing device 104 may execute instructions to collect data from one or more onboard sensors. For example, the sensors may include a compass 112, a barometer 114, a proximity sensor 116, an accelerometer 118, a gyroscope 120 and a magnometer 122. In some embodiments, the client computing device 104 may have some or all of these sensors. In some embodiments, the client computing device 104 may include additional sensors. The client computing device 104 may also include a cellular network transceiver 124 and a local network transceiver 126 for communicating with the backend components 131 and/or other client computing device 104, via the computer network 130. The client computing device 104 may also include a BLUETOOTH® module 128 for communication with the OBD cap 102. The client computing device 104 may collect Global Position System (GPS) coordinates from a GPS module 132, in communication with the GPS satellites 113.

In some embodiments, a processor of the client computing device 104 executes instructions to manage, receive and re-transmit data collected by the sensors, data received from the OBD cap 102 and/or other data, such as an account identifier associated with a customer account or a client computing device identifier. The client computing device 104 may transmit data to or otherwise communicate with back end components 131 via the computer network 130. The computer network 130 may be a network such as the Internet or other type of suitable network (e.g., local area network (LAN), a metropolitan area network (MAN), a wide area network (WAN), a mobile, a wired or wireless network, a private network, a virtual private network, etc.). The computer network may also be one or more cellular networks such as code division multiple access (CDMA) network, GSM (Global System for Mobile Communications) network, WiMAX (Worldwide Interoperability for Microwave Access) network, Long Term Evolution (LTE) network, etc. The processor of the client computing device 104 may also execute one or more applications to perform the tasks discussed above. The client computing device 104 may also execute one or more applications to allow a customer to pair the client computing device 104 with the OBD cap 102, manage a customer account, view driving statistics, change settings, etc.

The back end components 131 may include a data server 134, account database 136 and vehicle database 138. The back end components may communicate with each other through a communication network 141 such as a local area network or other type of suitable network (e.g., the Internet, a metropolitan area network (MAN), a wide area network (WAN), a mobile, a wired or wireless network, a private network, a virtual private network, etc.).

In some embodiments, the split sensing system 100 in general and the data server 134 in particular may include computer-executable instructions 140. A processor of the data server 134 may execute the instructions 140 to instantiate an access tool 142, a retrieval tool 144 and an analysis tool 146. The access tool 142 may receive data from the client computing device 104 and save the data to one or more databases, such as the vehicle database 138. The retrieval tool 144 may retrieve data from the vehicle database 138 or use an account identifier to access customer account information from the account database 136. The vehicle database 138 and account database 136 may be a data storage device such as random-access memory (RAM), hard disk drive (HDD), flash memory, flash memory such as a solid state drive (SSD), etc. The analysis tool 146 may perform one or more analyses on the vehicle data and/or customer account data.

The OBD cap 102 may connect to a client computing device 104 via wireless personal area network (PAN) interface, such as the BLUETOOTH® wireless PAN interface and use the client computing device as a proxy to access the computer network 130 (such as a cellular network or Wi-Fi network) to transmit data to a data server 134, receive software updates from a data server 134, etc. This split sensing approach allows near real time or real time data processing and provides a user facing interface on the client computing device 104 which may be an additional value to the customer. By linking up to the customer's smart phone, the system may be able to make use of all of the resources available on the phone, including location services, always on network and increases processing/data storage capabilities.

Figure 2:
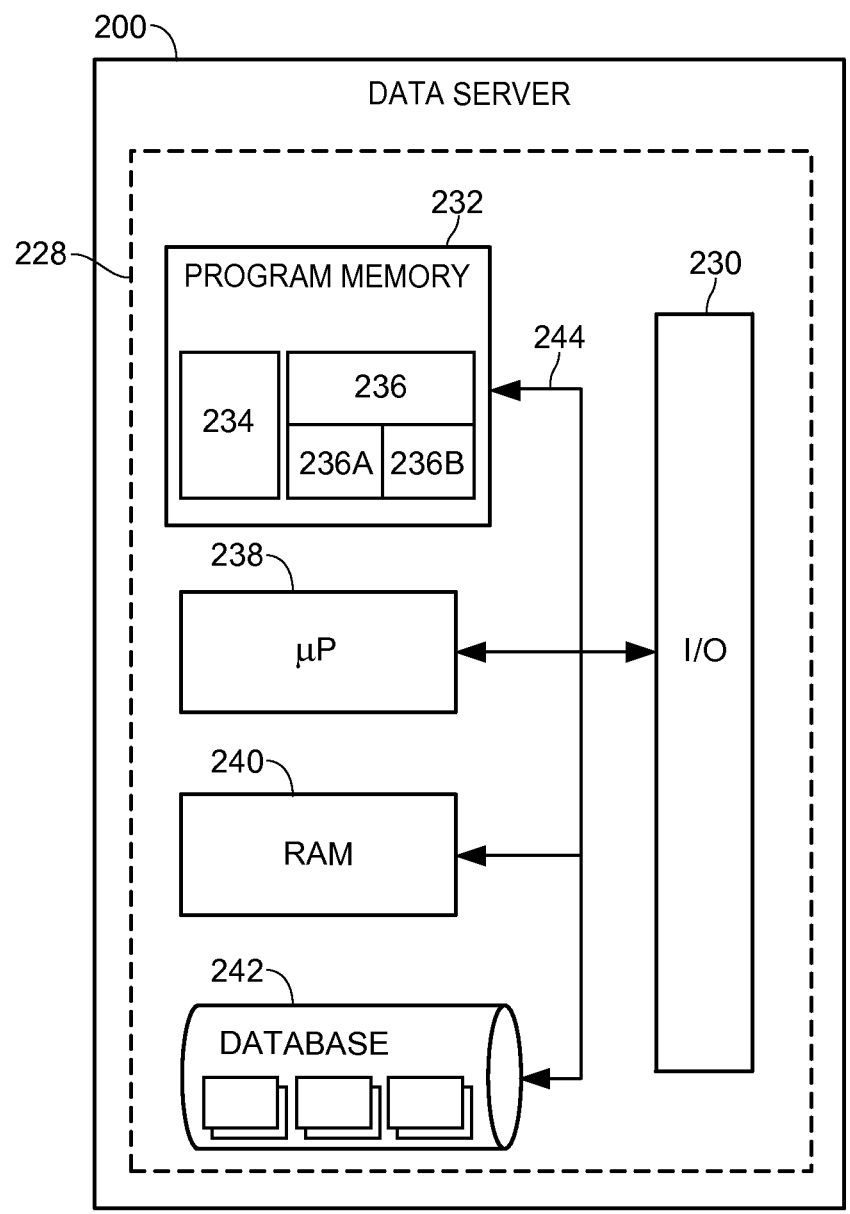
FIG. 2 is an exemplary architecture of data system of a system for uploading and verifying a file.

Referring now to FIG. 2, a data system 200 includes a controller 228. Exemplary data systems include the OBD cap 102, client computing device 104 and data server 134 as illustrated in FIG. 1. The controller 228 includes a program memory 232, a microcontroller or a microprocessor (µP) 238, a random-access memory (RAM) 240, and an input/output (I/O) circuit 230, all of which are interconnected via an address/data bus 244. The program memory 232 may store computer-executable instructions, which may be executed by the microprocessor 238. In some embodiments, the controller 228 may also include, or otherwise be communicatively connected to, a database 242 or other data storage mechanism (e.g., one or more hard disk drives, optical storage drives, solid state storage devices, etc.). It should be appreciated that although FIG. 2 depicts only one microprocessor 238, the controller 228 may include multiple microprocessors 238. Similarly, the memory 232 of the controller 228 may include multiple RAMs 234 and multiple program memories 236, 236A and 236B storing one or more corresponding server application modules, according to the controller's particular configuration.

Although FIG. 2 depicts the I/O circuit 230 as a single block, the I/O circuit 230 may include a number of different types of I/O circuits (not depicted), including but not limited to, additional load balancing equipment, firewalls, etc. The RAM(s) 234, 240 and the program memories 236, 236A and 236B may be implemented in a known form of computer storage media, including but not limited to, semiconductor memories, magnetically readable memories, and/or optically readable memories, for example, but does not include transitory media such as carrier waves.

Figure 3:
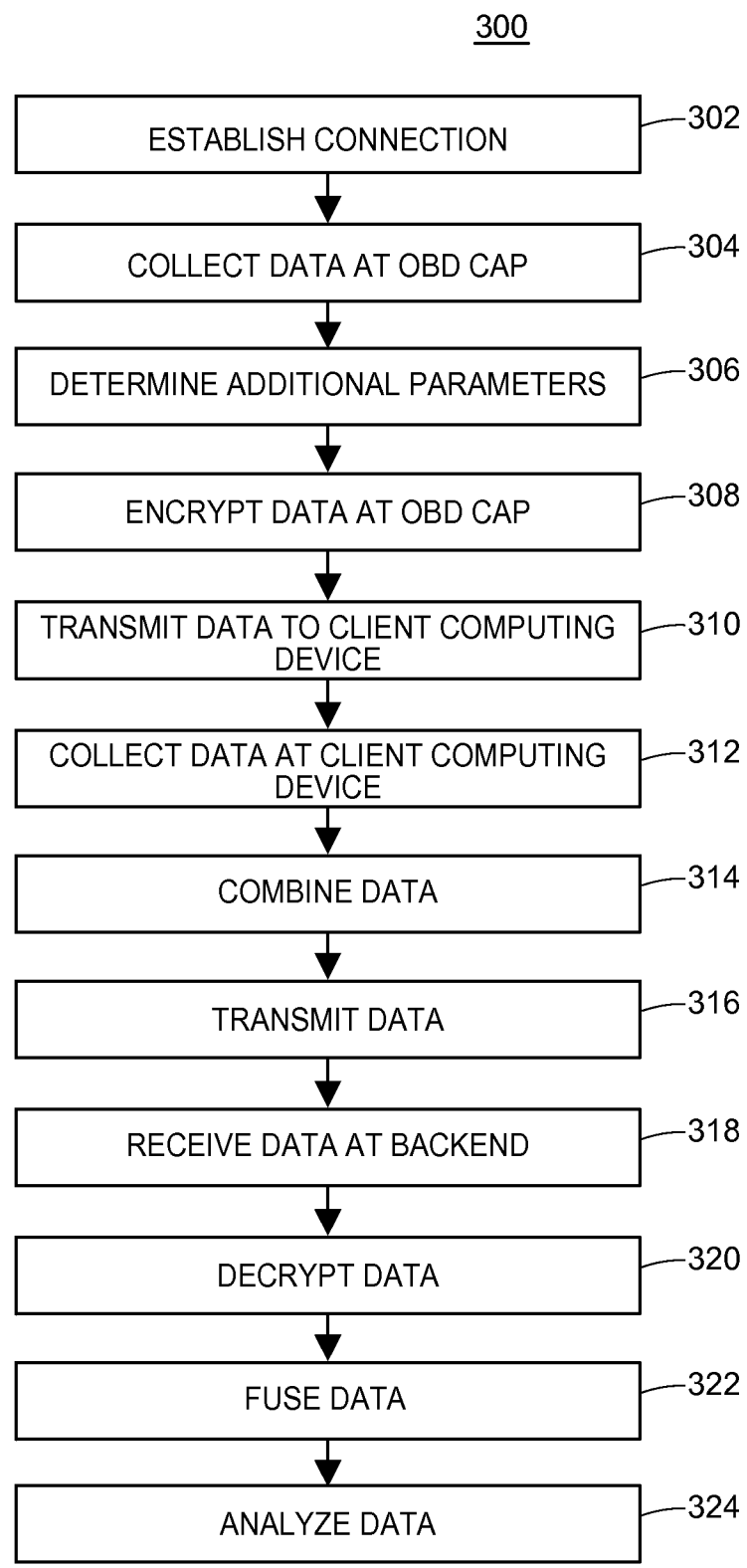
FIG. 3 is a flow chart illustrating an exemplary method for combining data from the OBD cap and client computing device for transmission to a data server.

FIG. 3 is a flowchart of a method, routine, algorithm or process 300 for split-sensing. The split sensing method 300 may combine data from the OBD cap 102 and client computing device 104 for transmission to a data server 134. The processor of the client computing device 104 may execute an instruction to establish a wireless personal area network connection (such as BLUETOOTH® interface) with the OBD cap. The client computing device may establish the wireless personal area connection by pairing the client computing device 104 with the OBD cap (block 302). The client computing device 104 may pair with the OBD cap 102 using a variety of methods known in the art and will not be further described for the sake of brevity.

The processor of the OBD cap 102 may execute an instruction stored in memory to collect data from one or more sources (block 304). For example, the OBD cap may collect one or more diagnostics data from the vehicle's On Board Diagnostics, such as the Vehicle Identification Number (VIN), odometer readings, speedometer readings, acceleration readings, emissions readings, operating time, trouble readings, etc. The processor of the OBD cap may also execute an instruction to communicate with one or more GPS satellites using the GPS module 109 and collect GPS coordinates at one or more times during operation of the vehicle. The OBD cap 102 may also collect data using one or more sensors, such as the accelerometer 111. The processor may also execute an instruction to collect data from the different sources at different data collection frequencies. For example, the processor may execute an instruction to collect acceleration data every minute, GPS data every 30 seconds, etc.

The processor of the OBD cap 102 may also execute an instruction to access the OBD data to determine one or more additional parameters, such as mileage and location (block 306). Mileage provides a secure reading of the total mileage driven by the customer vehicle. The processor of the OBD cap 102 may execute an application to compute mileage by integrating the OBD reported speed over time. In some embodiments, the processor of the OBD may execute an instruction to access the odometer reading via the OBD connection and compute mileage by integrating the odometer reading over time. The location application may record the approximate location of the customer as he drives and reports this data in a summarized form. In some embodiments, location can be fairly imprecise, for example accuracy to the nearest zip code would be adequate. Because, in some embodiments, the locations need only be approximate, the location data may be sampled infrequently, e.g. on the order of once per ten minutes. The processor may execute the application to compute mileage at a data collection frequency of once every minute and may transmit the computed mileage to the client computing device 104 at a data transmission frequency of once every month. Both the mileage data and location data may be uploaded in real time, or may have a transmission frequency on a weekly or monthly basis. For example, the mileage application may only need to report mileage at a data collection frequency of once every month.

The processor of the OBD cap 102 may execute an instruction to encrypt the data (block 308) and transmit the data to the client computing device 104 (block 310). Any of a variety of encryption methods can be used. Encryption methods are well known in the art and will not be discussed in further detail for the sake of brevity. If the OBD cap is unable to establish a communication link for an extended period of time, the odometer and acceleration data may be logged to local storage. When the OBD cap is able to establish communication with the client computing device, the data may be uploaded to the server along with the current location from the phone.

A processor of the client computing device 104 may also execute an instruction to collect data using the built in sensors (block 312). For example, the processor of the client computing device 104 may execute an instruction to collect direction data using the magnometer 122 and/or compass 112. The processor of the client computing device may use the GPS module 132 to connect to one or more GPS satellites 113 and collect GPS coordinates at a certain data frequency collection rate. In some embodiments, the client computing device may also use the barometer 114 to make GPS lockons faster. The processor may also execute an instruction to collect one or more data parameters from the proximity sensor 116, accelerometer 118 and/or gyroscope 120. The processor may also execute an instruction to analyze data collected from the accelerometer in real time or near real-time to identify risking driving patterns. The process may execute an instruction to augment this data using the data collected from the other sensors, such as the proximity sensor 116 and gyroscope 120. The processor may also execute an instruction to time-stamp/and or geocode all data collected from the onboard sensors.

The processor of the client computing device 104 may combine the encrypted OBD cap data and locally collected data (block 314) and transmit the data to one or more of the backend components 131 (block 316), such as the data server 134 illustrated in FIG. 1. The data server 134 may receive the data transmission from the client computing device 104 (block 318) and decrypt the data (block 320). The GPS may also authenticate the secure data stream to authenticate the origin and ensure that the data has not been tampered with. The data server 134 may fuse the two data streams (block 322) based on a map based inference to produce a more accurate location track. In some embodiments, location data from the client computing device 104 may be improved with odometer and acceleration information. For example, augmenting the location data with an odometer reading may create a more accurate location because the odometer is directly linked to the OBD bus. Augmenting location data with the acceleration data may increase accuracy because the OBD cap 102 is mechanically coupled to the vehicle in a consistent location and position, as opposed to the client computing device 104 bouncing around in a customer's pocket, or on the seat of the vehicle.

The data server 134 may then perform one or more analysis techniques on the data (block 324). For example, the processor of the data server may execute an instruction to analyze the location data in order to understand the distribution of locations of the vehicle over time, so that insurance may be assessed more accurately. The processor of the data server 134 may also execute an instruction to analyze the dynamics data to identify risky driving patterns and as a mechanism for collection of detailed information on hazardous road features such as difficult turns.

In some embodiments, the processor of the data server 134 may compare the data originating from the OBD cap 102 with the data originating from the client computing device 104 to check for inconsistencies. For example, the processor of the data server may execute an instruction 134 to compare GPS data to detect if the customer is attempting to spoof the OBD cap 102.

Figure 4:
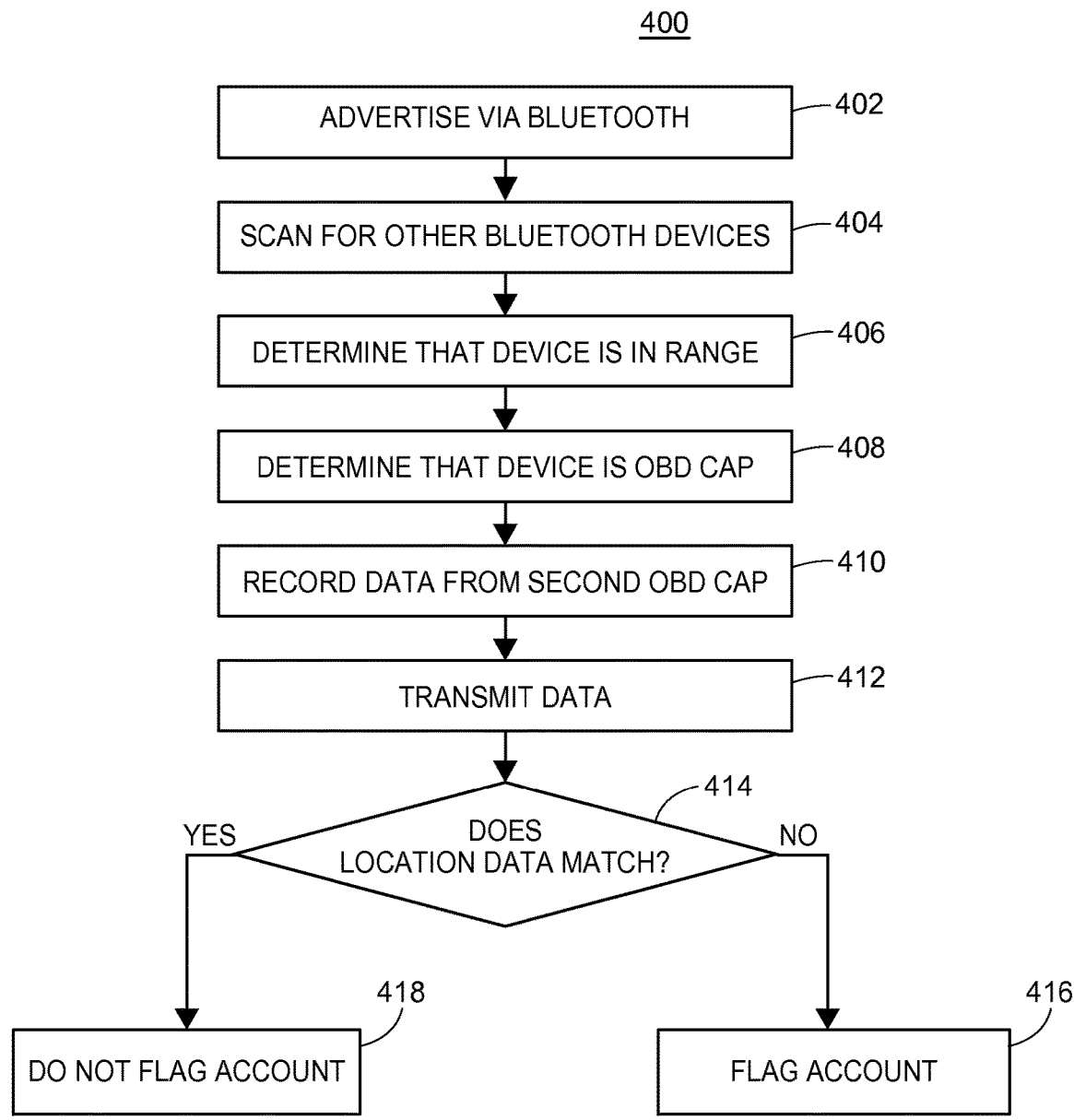
FIG. 4 is a flow chart illustrating an exemplary method for authenticating location data via BLUETOOTH® according to an embodiment of the present invention.

FIG. 4 is a flowchart of a method, routine or process 400 for authenticating location data via BLUETOOTH® according to an embodiment of the present invention. An authentication may provide increased statistical evidence that the reported data is valid and correct, thus exonerating most customers of fraud, and thus reducing the number of cases that might merit further investigation. In some embodiments, the method 400 can allow for cost savings by either eliminating the need for GPS or reducing the number of deployed OBD caps that include GPS hardware. The processor of the OBD cap may execute an instruction to advertise itself via BLUETOOTH® (block 402) and execute an instruction to scan for other BLUETOOTH® devices (block 404). The processor executing the instruction may determine that another BLUETOOTH® device is within range (block 406). The processor may also execute an instruction to identify the scanned BLUETOOTH® device and determine that the scanned BLUETOOTH® device is an OBD cap (block 408). For example, the processor executing the instruction may examine the MAC address of the scanned BLUETOOTH® device and determine if the MAC address contains one or more vendor specific bits, indicating that it is an OBD cap. For example, the scanned OBD cap may be a second OBD cap associated with a second vehicle insured by the company or an associated company. The range of BLUETOOTH® is such that two cars with OBD caps parked next to each other would be able to see each other. This might also apply to two cars waiting in line at a traffic stop.

The processor may record the MAC address of the second OBD cap as well as the location and time that the second OBD cap is proximal to the location of the first OBD (block 410). The collected data may be transmitted to the data server 134 (block 412) through the client computing device proxy (via, for example, the method 300 illustrated in FIG. 3.) Once the location data is received by the data server 134, a processor of the data server 134 may execute an instruction to determine if the location data from the first OBD cap matches the location data from the second OBD cap (block 414). If the data server 134 determines that the location data does not match (NO branch of block 414), the data server 134 may execute an instruction flag the account (block 416). If the data server determines that the location data does match (YES branch of block 416), the account may not be flagged (block 418). In some embodiments, the data server 134 may also receive location data from a second client computing device associated with a user account of the second vehicle. The data server 134 may cross reference the data to ensure that neither customer has attempted to spoof the OBD cap. If the data server 134 determines that the location data does not match, the data server 134 may execute an instruction to flag the account. If the data server determines that the location data does match, the account may not be flagged (block 416).

Figure 5:
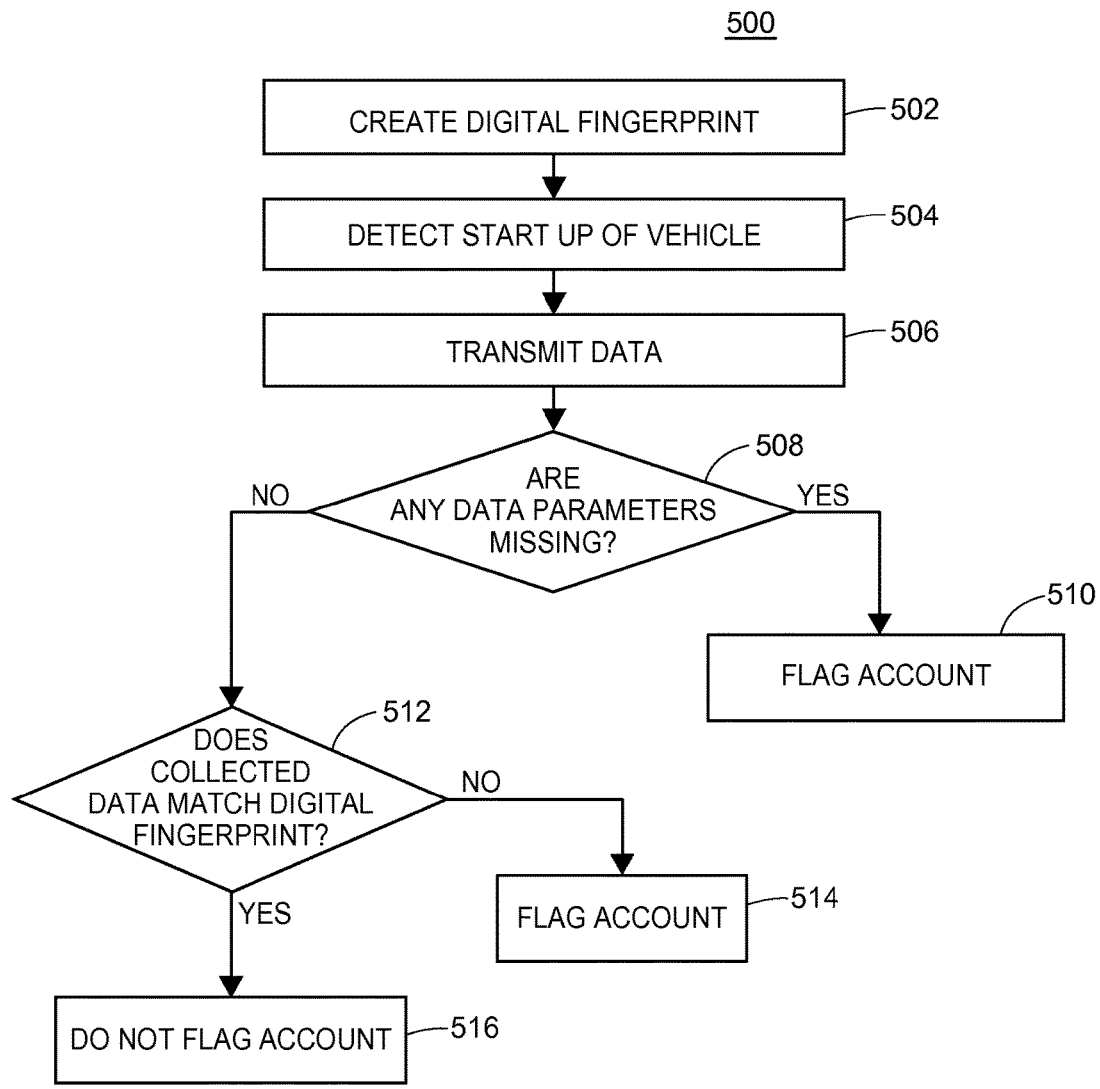
FIG. 5 is a flow chart illustrating an exemplary method for verifying a vehicle using a digital fingerprint.

FIG. 5 is a flowchart of a method, routine or process 500 for verifying a vehicle using a digital fingerprint. Many insurance companies calculate vehicle insurance rates based on the amount the customer drives a vehicle (i.e. Total mileage over a specific period of time). In some circumstances a customer may attempt to spoof the OBD cap, by using a Controller Area Network (CAN) emulator as a pass-through in order to spoof the VIN of the insured vehicle, while the cap remains installed in a different vehicle that remains parked. In this way, the customer would appear to rarely or never drive the vehicle, thus artificially lowering the customers insurance rates.

A digital fingerprinted may be created (block 502). The processor of the OBD cap may execute an instruction to collect data for establishing a digital fingerprint of the vehicle. For example, the processor may execute an instruction to record certain data parameters the first time the car is started while attached to the OBD cap. The collected data parameters may include obscure engine parameters and engine calibration data, acceleration profiles of the vehicle when starting, etc. The collected data parameters may be transmitted to the data server 134 through the client computing device proxy (via, for example, the method 300 illustrated in FIG. 3.). The data server 134 may store the data as the digital fingerprint in a database such as the account database 136 and/or vehicle database 138.

Each subsequent time the OBD cap 102 detects the car starting (block 504), the processor of the OBD cap may execute an instruction to collect the additional data parameters. For example, the OBD cap may detect the car starting via the OBD interface 108 or may determine that the car has started via vibration data via the accelerometer 111. The processor may execute an instruction to transmit (block 506) the additional data parameters to the data server 134 through the client computing device proxy (via, for example, the method 300 illustrated in FIG. 3). The data server 134 may receive the data and determine if any of the data parameters are missing (block 508). If the processor executing the instruction determines that one or more data parameters are missing (YES branch of block 508), the processor may flag the customer's account (block 510). If the processor executing the instruction determines that none of the data parameters are missing (NO branch of block 508), the processor may execute an instruction to determine whether the received data parameters match the digital fingerprint (block 512). If the processor determines that the data parameters do not match the digital fingerprint (NO branch of block 512), then the account may be flagged (block 514). If the processor determines that the data parameters do match the digital fingerprint (YES branch of block 512), than the account may not be flagged. For example, the digital fingerprint may include accelerometer readings indicating that certain vibrations occurred when the vehicle started. If the data parameters collected by the OBD cap do not indicate that the vehicle vibrated when the OBD cap received an indication that the engine was started, the account may be flagged (block 516).

In some embodiments (not shown), a customer may attempt to spoof the system by moving the OBD cap to a different vehicle. Though it may not be feasible to determine the model of the new vehicle with complete accuracy, the processor of the OBD cap may detect when it is disconnected from the OBD port (i.e. when it loses power) and the device can track the amount of time it is disconnected. For example, in some embodiments the OBD cap may have an internal capacitor that may keep a real-time clock running at very low power. However, in embodiments where the OBD cap does not have a battery, there may be a limit to the length of time that the device can track while disconnected. While the cap is installed and the vehicle is not driving or being serviced, the acceleration data received by the OBD cap should be within a defined set of parameters.

In many circumstances, removing the OBD cap will induce very large transients compared with those observed from normal conditions (e.g. opening and slamming doors, etc.) Suspicious motions, without power disconnection should be unusual. After detecting a reconnection, the OBD cap may execute an instruction to retrieve the VIN number over the OBD interface. The OBD cap may use the client computing device as a proxy to transmit the VIN number reading to data server 134. If the processor determines that the received VIN number does not match the VIN number on file, the processor may then execute an instruction to flag the account, and an agent of the company may follow up and query the customer about the new car.

Figure 6:
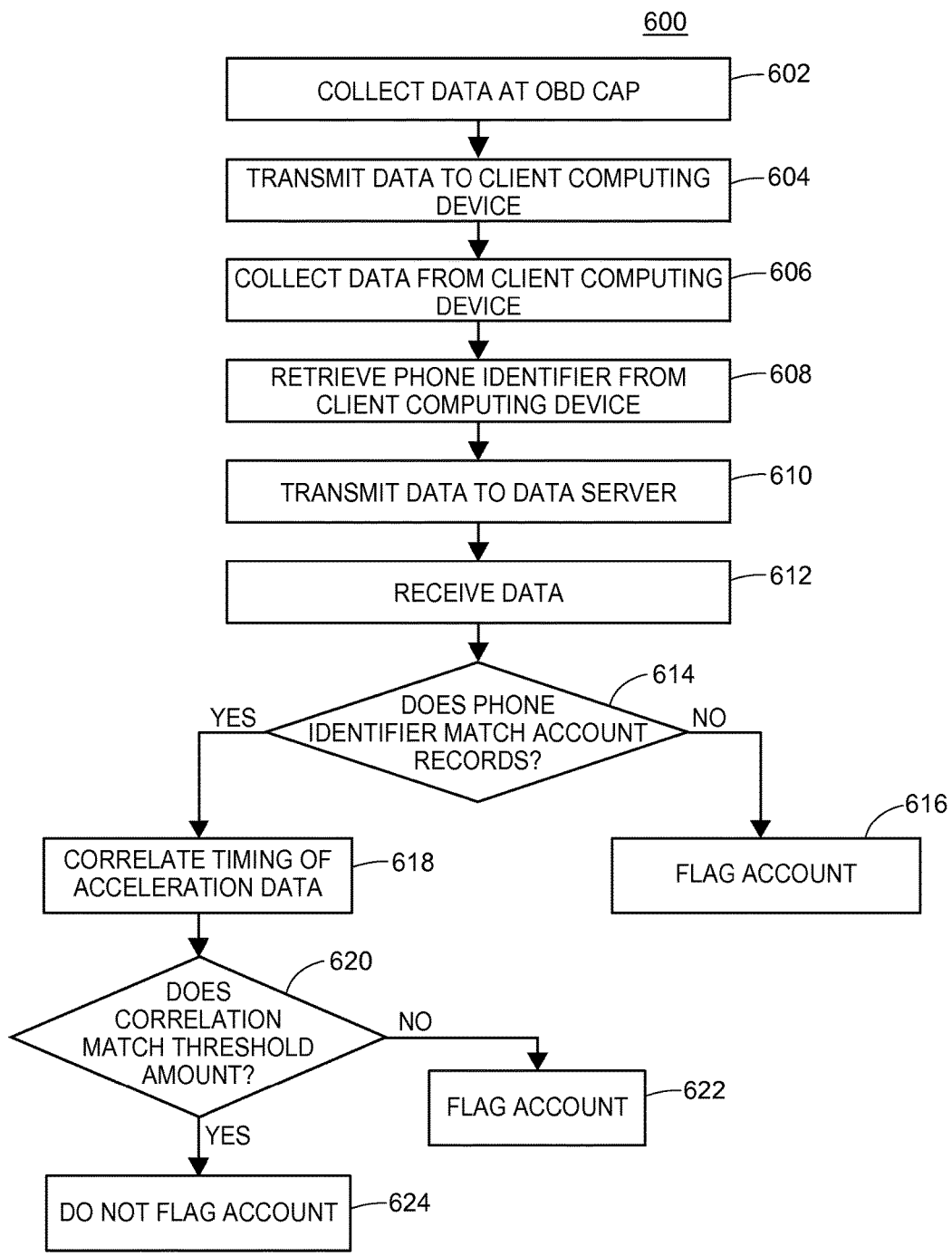
FIG. 6 is a flow chart illustrating an exemplary method for fusing data from the client computing device and the OBD cap to determine the identity of the driver of the vehicle.

FIG. 6 illustrates a method 600 for fusing data from the client computing device and the OBD cap to determine the identity of the driver of the vehicle. The processor of the OBD cap may execute an instruction to record acceleration data when the driver first enters the vehicle (block 602). For example, the accelerometer of the OBD cap may sense when a door is opened and shut, as well as the change in vehicle orientation as the driver and passengers enter the vehicle. When the driver sits down in the seat, the vehicle may twist towards the driver's side. Accordingly, The accelerometer of the OBD cap may register a reading on the X and Z axis. In some embodiments, the OBD cap may also detect this motion with a gyroscope. The processor of the OBD cap may execute an instruction to transmit the OBD accelerometer data to the client computing device 104 (block 604).

The accelerometer and gyroscope of the client computing device may also detect the acceleration trace as the user of the client computing device sits down (block 606). The processor of the client computing device may also execute an instruction to retrieve a device identifier from the client computing device (block 608). The client computing device 104 may receive the data from the OBD cap, and transmit data to the data server 134 including both the OBD accelerometer data from the OBD cap, the device accelerometer data and the device identifier (block 610).

The data server 134 may receive the data (block 612) and a processor of the data server may execute an instruction to determine if the device identifier received matches the device identifier associated with the insurance account (block 614). For example, the processor of the data server may access an instruction to access the account database and/or vehicle data base 138 to retrieve the device identifier associated with the account. If the processor executing the instruction determines that the received device identifier does not match the identifier associated with the account (NO branch of block 614), the processor of the data server 134 may execute an instruction to flag the account (block 616). If the processor executing the instruction determines that the received device identifier does match the identifier associated with the account (YES branch of block 614), the processor of the data server 134 may execute an instruction to correlate the timing of the acceleration data (block 618). The processor may then execute an instruction to determine if the correlation meets a threshold amount (block 620). If the processor executing the instruction determines that the correlation does not meet the threshold amount (NO branch of block 620), the processor of the data server 134 may execute an instruction to flag the account (block 622). If the processor executing the instruction determines that the correlation meets the threshold amount (YES branch of block 620), the processor of the data server 134 may execute an instruction to correlate the timing of the acceleration data (block 624). By correlating the timing of the two acceleration traces, the data server can estimate the probability that the holder of the phone is the driver. For example, if the client computing device is a smart phone, the owner of the phone can be derived from the IMEI and phone number data.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the computing device 102, the server 120, or any combination of computing devices within the system 100). The routines may be included as part of any of the modules described in relation to FIG. 1 or 2 or as part of a module that is external to the system illustrated by FIGS. 1 and 2. For example, the methods may be part of a browser application or an application running on the computing device 102 as a plug-in or other module of the browser application. Further, the methods may be employed as "software-as-a-service" to provide a computing device 102 with access to the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits,"

"values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for segmenting a customer base and implementing specific behaviors for each customer segment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this file conflicts with any meaning or definition of the same term in a file incorporated by reference, the meaning or definition assigned to that term in this file shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A computer-implemented method, the method comprising:
   receiving, from an On Board Diagnostic (OBD) cap, a plurality of OBD cap data, the plurality of OBD cap data being generated by the OBD cap and indicating a location of a vehicle in which the OBD cap is located;
   generating, by a client computing device, a plurality of client computing device data indicating a location of the client computing device while being located in the vehicle,
   transmitting, by the client computing device to a data server via a computer network, the plurality of OBD cap data and the plurality of client computing device data as combined data, the combined data including location data that is augmented by acceleration data included in the plurality of OBD cap data such that an accuracy of a location of the vehicle indicated by the plurality of client computing device data is increased due to the OBD cap being mechanically coupled to the vehicle in a stationary position while the OBD cap data is generated;
   selecting, via the data server, one or more first data parameters from the plurality of OBD cap data;
   selecting, via the data server, one or more second data parameters from the plurality of client computing device data;
   determining, via the data server, whether the one or more first data parameters and the one or more second data parameters match one another based upon at least one of (i) the location of the vehicle as indicated by the plurality of OBD cap data matching that of the plurality of client computing device data, or (ii) by correlating timing of the one or more first data parameters to the one or more second data parameters and determining whether the correlation meets a threshold correlation amount; and
   flagging, via the data server, an insurance account associated with the OBD cap when the one or more first data parameters and the one or more second data parameters do not match one another.

2. The method of claim 1, wherein the plurality of OBD cap data is encrypted, and further comprising:
   decrypting, via the data server, the plurality of OBD cap data.

3. The method of claim 1, further comprising:
determining, via the data server, if one or more data parameters are missing from the one or more first data parameters selected from the plurality of OBD cap data.

4. The method of claim 3, further comprising:
when one or more data parameters are not missing from the one or more first data parameters, determining, via the data server, whether a subset of the plurality of OBD cap data matches a digital fingerprint; and
flagging, via the data server, an insurance account associated with the OBD cap when the subset of the plurality of OBD cap data does not match the digital fingerprint.

5. The method of claim 1, further comprising:
extracting, via the data server, a first client computing device identifier from the client computing device data;
retrieving, via the data server, a second client computing device identifier associated with a customer account;
determining, via the data server, whether the first client computing device identifier matches the second client computing device identifier; and
flagging, via the data server, an insurance account associated with the client computing device when the first client computing device identifier does not match the second client computing device identifier.

6. The method of claim 1, wherein the one or more first data parameters include first acceleration data, wherein the one or more second data parameters include second acceleration data, and further comprising:
determining whether the one or more first data parameters and the one or more second data parameters match one another by correlating the timing of the first acceleration data and the second acceleration data and determining whether the correlation meets a threshold correlation amount.

7. The method of claim 1, further comprising:
receiving, from the client computing device via the computer network, a plurality of additional OBD cap data generated by a second OBD cap;
selecting, via the data server, one or more third data parameters from the plurality of additional OBD cap data; and
determining, via the data server, whether the one or more first data parameters match the one or more third data parameters.

8. The method of claim 7, further comprising:
flagging, via the data server, an insurance account associated with the first OBD cap when the one or more first data parameters do not match the one or more third data parameters.

9. The method of claim 1, wherein the one or more first data parameters further include acceleration data originating from the OBD cap, and
wherein the one or more second data parameters further include acceleration data originating from the client computing device.

10. A computer-implemented method, the method comprising:
receiving, via a wireless personal area network, first data from an On Board Diagnostic (OBD) cap located in a vehicle, the first data being generated by the OBD cap and indicating a location of the vehicle;
recording, via an internal sensor associated with a client computing device, second data indicating a location of the client computing device while being located in the vehicle;
combining, via the client computing device, the first data and the second data into third data;
transmitting, via the client computing device, the third data to a data server when communication between the OBD cap and the client computing device is established, the third data including location data that is augmented by acceleration data included in the plurality of OBD cap data such that an accuracy of a location of the vehicle indicated by the plurality of client computing device data is increased due to the OBD cap being mechanically coupled to the vehicle in a stationary position while the OBD cap data is generated;
determining, via the data server, whether (i) one or more first data parameters associated with the first data, and (ii) one or more second data parameters associated with the second data, match one another based upon at least one of (i) the location of the vehicle as indicated by the plurality of OBD cap data matching that of the plurality of client computing device data, or (ii) by correlating timing of the one or more first data parameters to the one or more second data parameters and determining whether the correlation meets a threshold correlation amount; and
flagging, via the data server, an insurance account associated with the OBD cap when the one or more first data parameters and the one or more second data parameters do not match one another.

11. The method of claim 10, wherein the first data is encrypted.

12. The method of claim 10, further comprising:
retrieving, via the data server, a client computing device identifier.

13. The method of claim 10, wherein the internal sensor is an accelerometer and the second data further includes acceleration data.

14. The method of claim 10, further comprising:
receiving, from the OBD cap via the wireless personal area network, OBD data generated by a second OBD cap.

15. A computer-implemented method, the method comprising:
receiving, from an On Board Diagnostic (OBD) cap, a plurality of OBD cap data including OBD acceleration data and OBD Global Positioning System (GPS) data, the plurality of OBD cap data being generated by the OBD cap while located in a vehicle;
generating, by a client computing device, a plurality of client computing device data including client computing device acceleration data and client computing device GPS data while being located in the vehicle;
transmitting, by the client computing device, the plurality of OBD cap data and the plurality of client computing device data as combined data, the combined data including the Global Positioning System (GPS) data generated by the client computing device that is augmented by acceleration data included in the plurality of OBD cap data such that an accuracy of a location of the vehicle indicated by the plurality of client computing device data is increased due to the OBD cap being mechanically coupled to the vehicle in a stationary position while the OBD cap data is generated;
extracting, via one or more processors associated with a data server, the OBD acceleration data and the OBD GPS data from the plurality of OBD cap data;

extracting, via one or more processors associated with the data server, client computing device acceleration data and client computing device GPS data from the plurality of client computing device data;

determining, via one or more processors associated with the data server, whether the OBD GPS data corresponds to the client computing device GPS data based upon at least one of (i) the location of the vehicle as indicated by the plurality of OBD cap data matching that of the plurality of client computing device data, or (ii) by correlating timing of the OBD acceleration data and the client computing device acceleration data and determining whether the correlation meets a threshold correlation amount; and when it is determined that the OBD GPS data does not correspond to the client computing device GPS data, adjusting, via one or more processors associated with the data server, an insurance premium of a vehicle insurance account associated with the client computing device.

16. The method of claim 12, further comprising:

determining, via the data server, whether the client computing device identifier matches an identifier corresponding to a vehicle insurance account associated with the client computing device; and flagging, via the data server, the vehicle insurance account associated with the client computing device when the client computing device does not match the identifier.

17. The method of claim 15, further comprising:

when one or more data parameters are missing from the plurality of OBD cap data, flagging, via one or more processors associated with the data server, an insurance account associated with the OBD cap.

18. The method of claim 15, further comprising:

when a subset of the plurality of OBD cap data does not match a digital fingerprint, flagging, via one or more processors associated with the data server, an insurance account associated with the OBD cap.

* * * * *